(12) United States Patent
Tene

(10) Patent No.: US 10,839,143 B2
(45) Date of Patent: Nov. 17, 2020

(54) REFERENTIAL GESTURES WITHIN CONTENT ITEMS

(71) Applicant: Dropbox, Inc., San Francisco, CA (US)

(72) Inventor: Ran Tene, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 43 days.

(21) Appl. No.: 16/023,446

(22) Filed: Jun. 29, 2018

(65) Prior Publication Data

US 2020/0004809 A1 Jan. 2, 2020

(51) Int. Cl.
*G06F 40/169* (2020.01)
*G06F 3/0481* (2013.01)
*G06F 3/0482* (2013.01)
*G06F 16/583* (2019.01)
*G06F 40/134* (2020.01)

(52) U.S. Cl.
CPC .......... *G06F 40/169* (2020.01); *G06F 3/0482* (2013.01); *G06F 3/04817* (2013.01); *G06F 16/5846* (2019.01); *G06F 16/5854* (2019.01); *G06F 40/134* (2020.01)

(58) Field of Classification Search
CPC ............... G06F 17/241; G06F 16/5854; G06F 16/5846; G06F 3/04817; G06F 3/0482; G06F 17/2235
See application file for complete search history.

(56) References Cited

U.S. PATENT DOCUMENTS

| | | | |
|---|---|---|---|
| 2005/0156873 A1* | 7/2005 | Walter | H04L 51/04 345/156 |
| 2007/0285399 A1* | 12/2007 | Lund | G06F 3/04883 345/173 |
| 2008/0021880 A1* | 1/2008 | Ren | G06F 16/957 |
| 2012/0239761 A1* | 9/2012 | Linner | G06F 17/2765 709/206 |
| 2012/0266105 A1* | 10/2012 | Li | H04W 4/00 715/810 |
| 2012/0304133 A1 | 11/2012 | Nan et al. | |
| 2014/0003714 A1 | 1/2014 | Mei et al. | |
| 2014/0129919 A1* | 5/2014 | Benson | G06F 9/543 715/234 |
| 2014/0161356 A1* | 6/2014 | Tesch | H04L 51/063 382/196 |
| 2014/0356844 A1 | 12/2014 | Bharadwaj | |
| 2015/0195226 A1* | 7/2015 | McDowell-White | H04L 51/08 715/752 |
| 2015/0339706 A1* | 11/2015 | Tew | G06Q 30/0251 705/14.49 |
| 2016/0110906 A1* | 4/2016 | Ahuja | G06T 11/60 |
| 2017/0249291 A1* | 8/2017 | Patel | G06F 17/276 |
| 2017/0308290 A1* | 10/2017 | Patel | G06F 3/04886 |
| 2018/0032203 A1* | 2/2018 | Sepulveda | G06F 3/016 |

* cited by examiner

*Primary Examiner* — Mandrita Brahmachari
(74) *Attorney, Agent, or Firm* — Polsinelli PC

(57) ABSTRACT

The disclosed technology provides for creating and displaying referential gestures in a content item. In some instances many words may be required to clearly describe a point that can be made in few words by referencing visual media. The present technology provides a method for associating a referential gesture to a text string and a particular location in a visual media item.

21 Claims, 15 Drawing Sheets

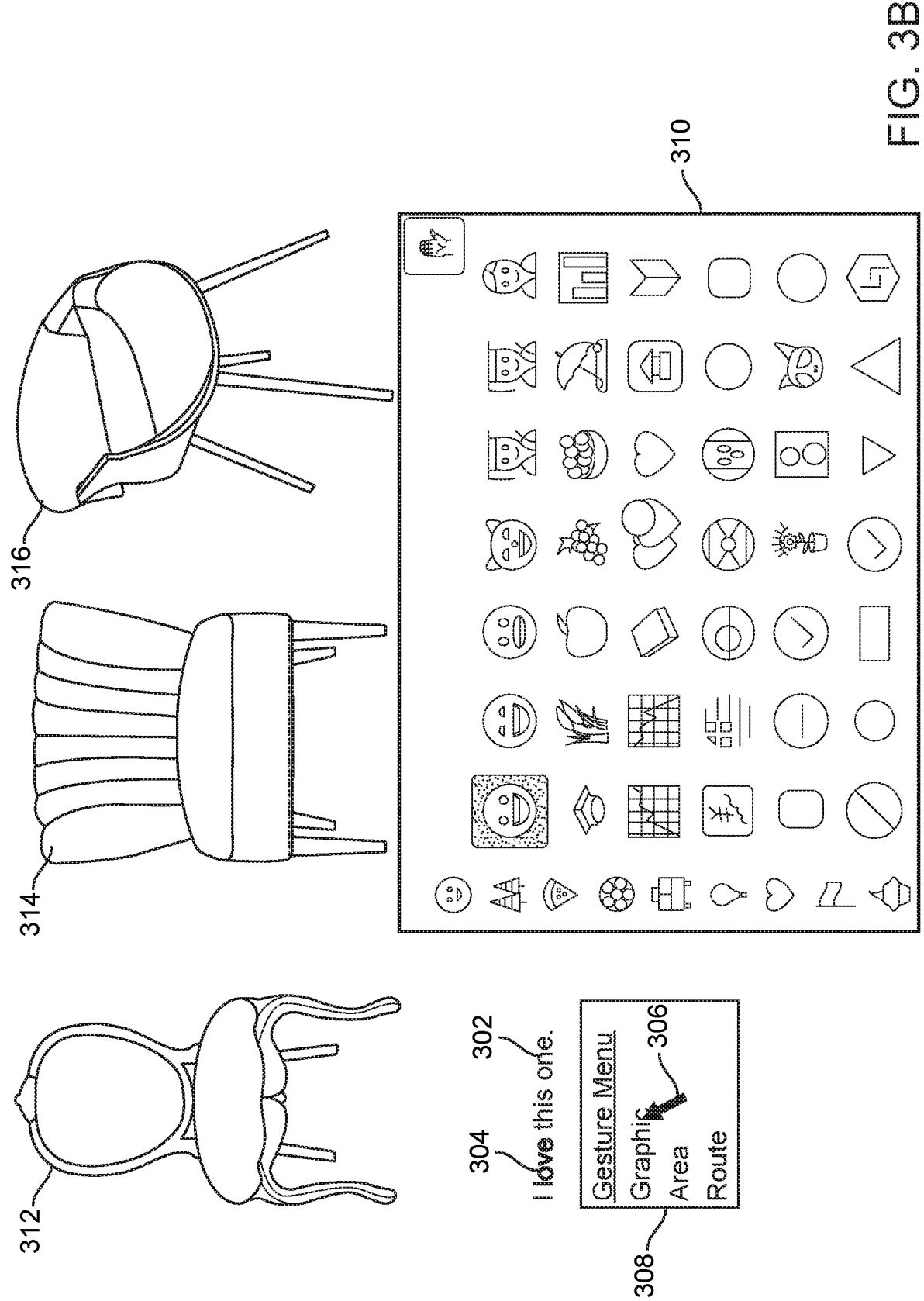

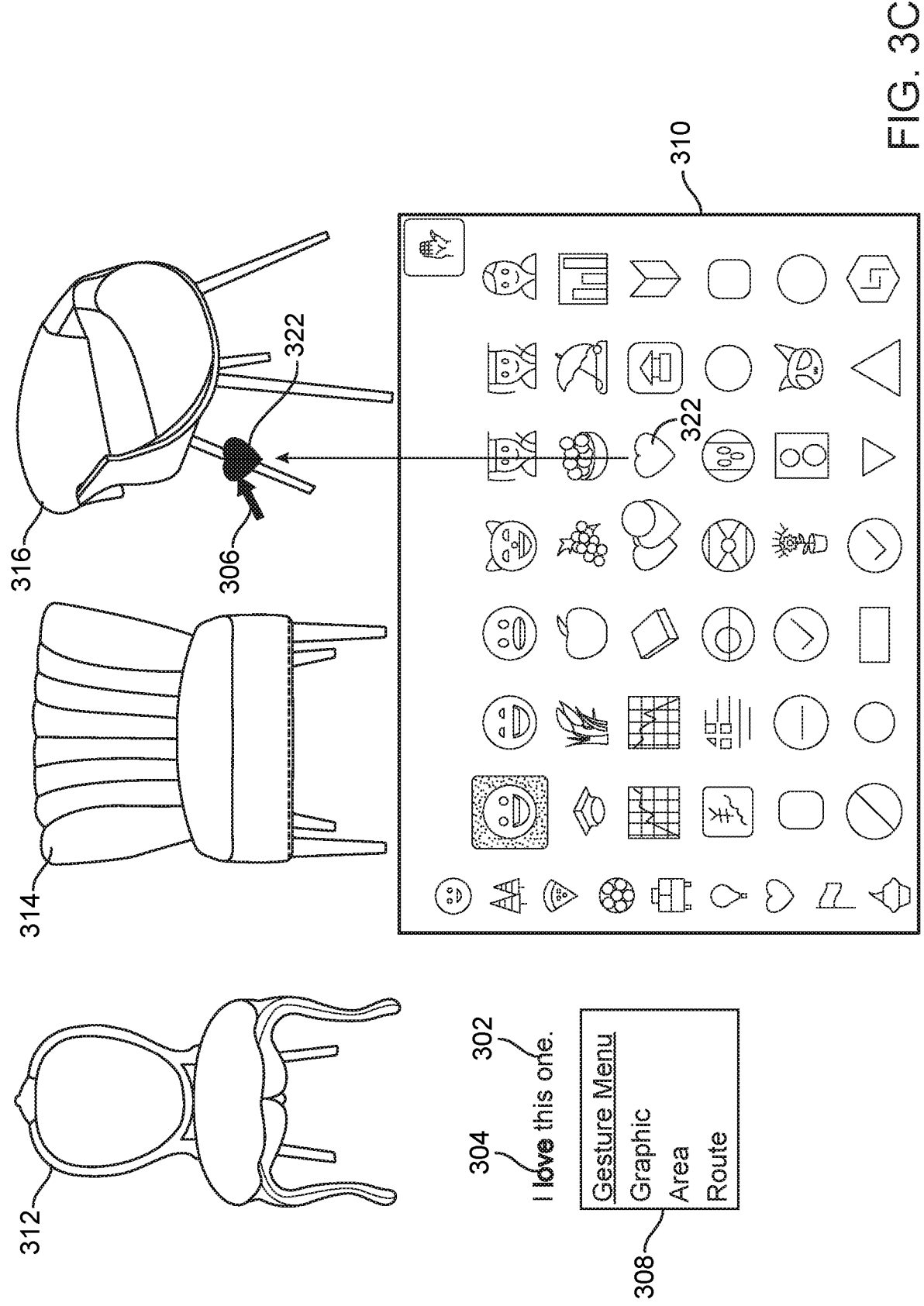

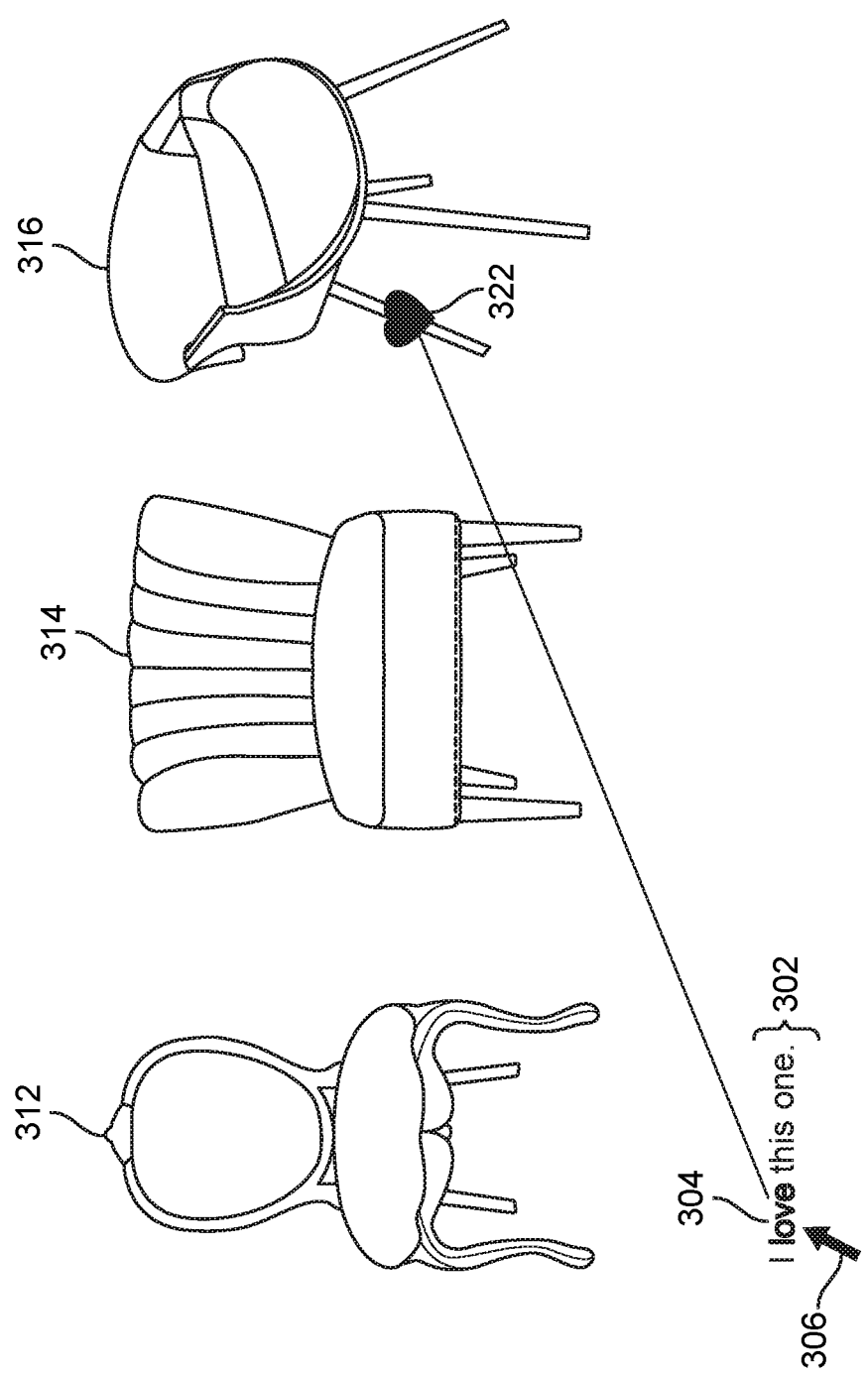

REFERENTIAL GESTURES WITHIN CONTENT ITEMS

TECHNICAL FIELD

The present technology pertains to the creation or editing of a content item; and more specially pertains to including gestures to provide additional context to a writing referencing a visual media item within a content item.

BACKGROUND

There is no perfect substitute for in person communication. People convey significant context with body language and hand gestures that are lost in communication platforms other than in person communications. Writings are the most prone to lacking context that is present with in person communications. As a consequence it can require significant effort and extra words to clearly convey a thought in writing as compared to conveying the same thought in person.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 3A, 3B, 3C, 3D, and 3E show example graphical user interfaces for creating and displaying a referential gesture in accordance with some embodiments of the present technology;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for providing new capabilities to authors and editors of content items to add additional context to writings in digital content items. The present technology provides a mechanism to author referential gestures in association with a text string to provide additional context. Such referential gestures can more clearly convey certain concepts, especially when the text string is referencing visual media. Additionally, using a referential gesture can result in significant time savings by resulting in fewer words needed to clearly convey a thought.

Referential gestures are more than annotations. While, at a first glance, the referential gestures illustrated in the accompanying figures appear as if they could be annotations, this is merely due to the limitations of the printed page as opposed to a digital content item. As will be described further herein, referential gestures are defined by a gesture definition including at least a reference to the text string, an identification of the visual media item, and a reference to the location in the visual media item. Therefore, in contrast to an annotation drawn in a document, a referential gesture is linked to its origin and end point. This allows for editing of a content item, or presentation of a content item in windows or frames that can be different sizes, or resized while maintaining the reference of a referential gesture. An annotation in contrast, is not linked to its origin and end point, and is rather a static object. Edits to the document can cause the origin, end point, or annotation object to shift. Resizing a window, or presentation of the document in different sized windows can also cause the annotation object to shift. Another difference is that referential gestures can be rendered upon selection of a text string, while annotations are statically present. A content item can have many referential gestures without cluttering a view of the content item. Furthermore referential gestures can include animations while annotations are static content.

Figure 1:
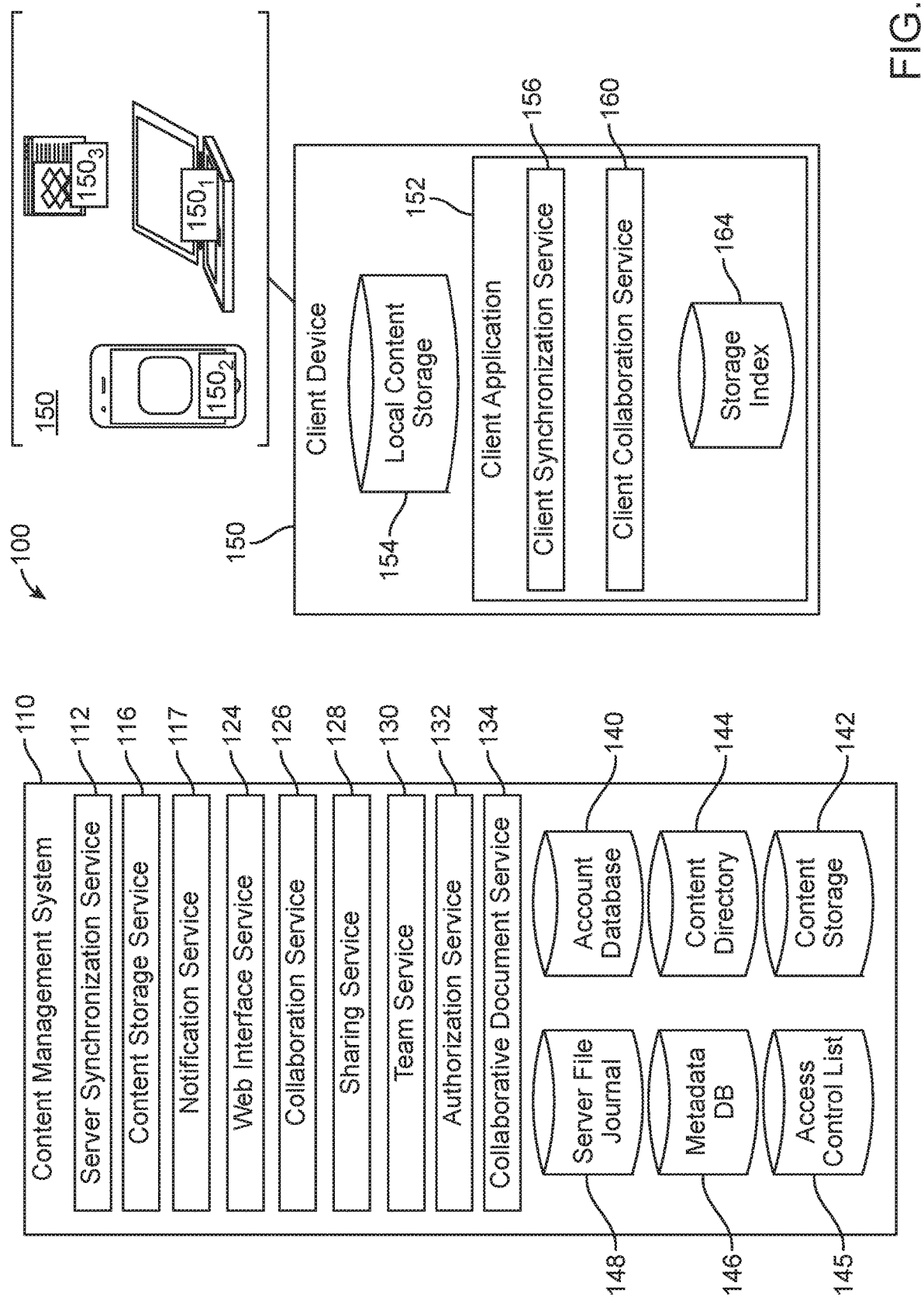
FIG. 1 shows an example of a content management system and client devices.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on local content storage 154 of client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system in local content storage 154 accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
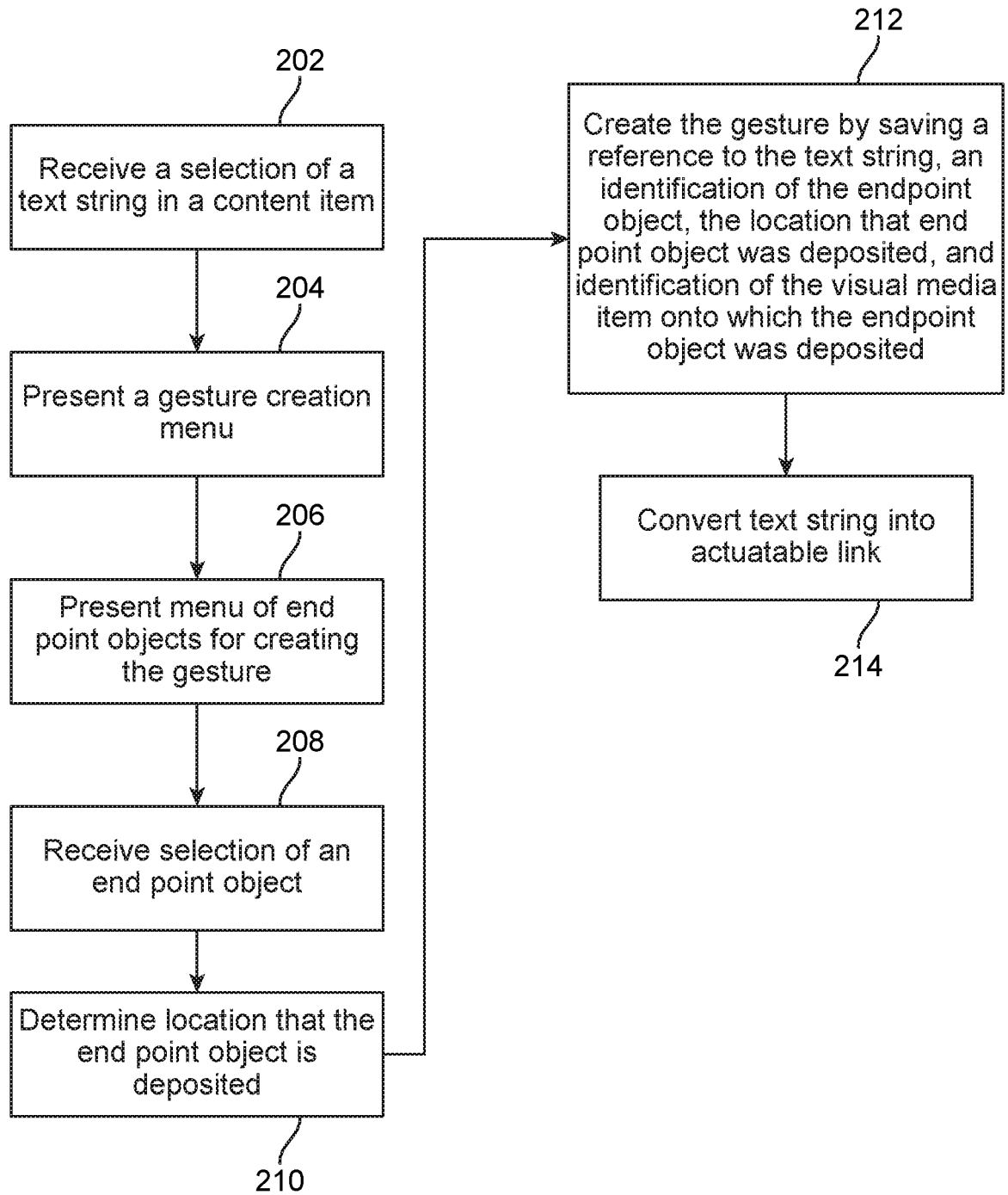
FIG. 2 shows an example method of creating a referential gesture in accordance with some embodiments of the present technology.

FIG. 2 illustrates an example method embodiment for creating and presenting a gesture within a content item and will be discussed with reference to FIG. 3A, FIG. 3B, FIG. 3C, and FIG. 3D which graphically illustrate the creation of a referential gesture. While these figures will be discussed together for clarity of explanation, the method illustrated in FIG. 2 should not be limited by the embodiments illustrated in FIG. 3A, FIG. 3B, FIG. 3C, and FIG. 3D, and vice versa.

The content item can be any type of content item that is able to render a referential gesture within the content item. In some embodiments, rendering a referential gesture requires an ability to execute a code script. In some embodiments, the content item is a collaboration content item as introduced above. The content item can include at least text string and a visual media item, where the text string refers to at least a portion of the visual media item.

FIG. 3A, FIG. 3B, FIG. 3C, and FIG. 3D illustrate a portion of a content item displaying visual media items (chairs 312, 314, 316), and sentence 302 including text string 304 referencing at least a portion of one of the visual media items.

Figure 3A:
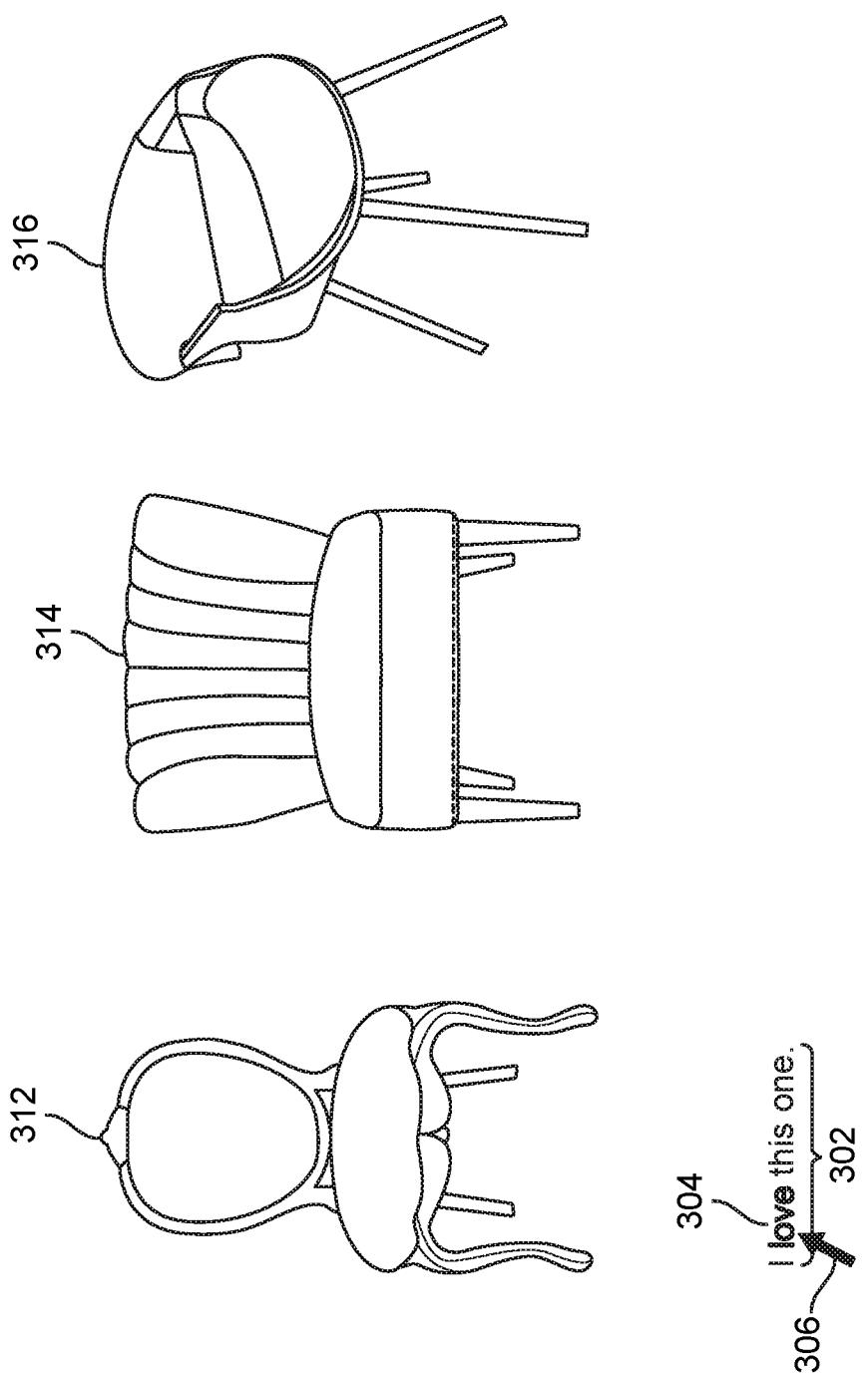

To create a referential gesture in association with the text string referencing the portion of the visual media item, a content item editor application, e.g., collaboration content item editor, such as a word processing application, a presentation application, etc., can receive (202) a selection of the text string 304 (in FIG. 3A). The selection of the text string can include detecting a pointer 306 on top of the text string in combination with receiving a command launching gesture creation menu 308 (in FIG. 3B) (e.g., through a right-click of a mouse, multi-finger press on a track pad, etc.), or by typing a command or sequence of keystrokes following the text string, among other possible selection actions. In response to receiving (202) the selection of the text string, the content item editor can present (204) gesture creation menu 308.

In some embodiments, the gesture creation menu 308 can include options for the type of gesture the author desires to create. In FIG. 3B, gesture creation menu 308 provides options to create a type of gesture that points to a graphic (or multiple graphics), an area, or a route. Gesture creation menu 308 can receive a selection of the type of gesture, and then present (206) end point object menu 310 which presents selectable objects to be associated with the gesture, as illustrated in FIG. 3B. While not shown, end point object menu can also present shapes or a tool to define an area.

In some embodiments, one or more of menus 308 and 310 may not be needed. For example, end point object menu 310 can be launched directly from the selection (202) of the text string. In another example, both gesture creation menu 308 and end point object menu 310 can be bypassed by immediately presenting a default end point object (e.g., heart icon, smiley face icon, etc.). The default end point object could be used to launch end point object menu 310 should the default end point object not be desired.

Once an end point object or end point object menu 310 is presented, a user can utilize an input device to select (208) an end point object, such as end point object 322 (in FIG. 3C) and drag end point object 322 (in FIG. 3C) to a location on or near a visual media item. For example, as illustrated in FIG. 3C, a user has selected the heart end point object 322 and dragged it onto visual media item 316.

The content item editor application can determine (210) the location that end point object 322 was deposited, and can create (212) the referential gesture by saving a gesture definition that includes a reference to text string 304, an identification of end point object 322, the location that end point object 322 was deposited, and an identification of visual media item 316 onto which end point object 322 was deposited.

In some embodiments, a user can also select additional options such as to select a type of line (e.g., solid line, dashed line, blinking line, etc.). In some embodiments, the user can select multiple end point objects so that multiple gesture can reference the same text string but different locations in the visual media. In some embodiments, the user can configure multiple gestures associated with multiple strings to be linked such that when a gesture associated with one string is selected, the multiple gestures associated with other linked strings can be displayed simultaneously, or automatically in a sequence.

Figure 3D:
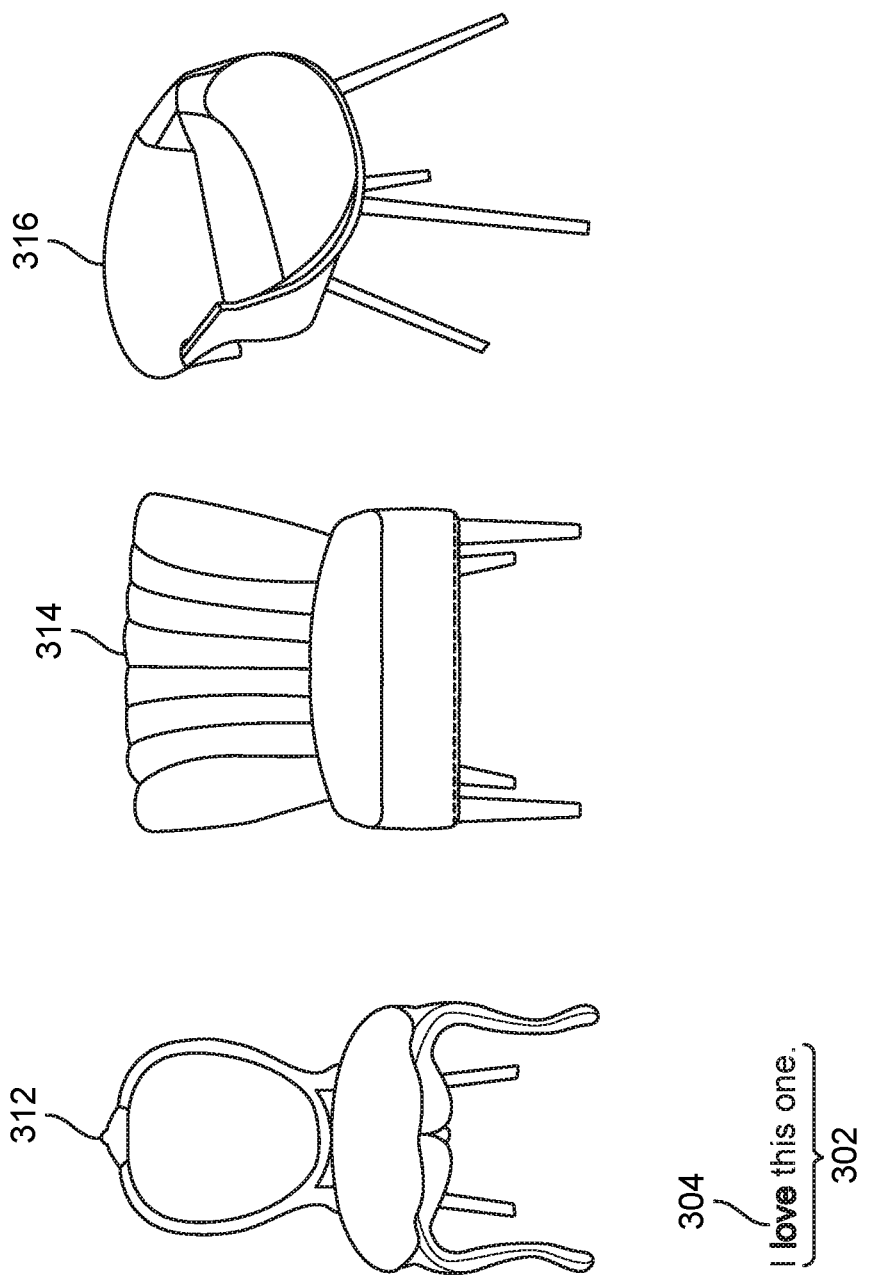

The content item editor application can further convert (214) the text string into an actuatable link to finish creating the referential gesture. The actuatable link is similar to a hyperlink that references a URL, except here, the hyperlink references the gesture definition. The gesture definition can be stored in a table, or in a hyperlink, or otherwise encoded into the content item. FIG. 3D illustrates an example of sentence 302 having a gesture associated with string 304. In FIG. 3D, string 304 appears as if string 304 is hyperlinked. In some embodiments, string 304 can visually indicate that it is associated with a gesture, but appear differentiated from a hyperlink (e.g., sting 304 can be bolded, highlighted, have colored text, different font, etc.) As seen in FIG. 3E, when a user operates a pointing device to cause pointer 306 to hover over string 304 to which the gesture refers, the gesture and end point object 322 can appear.

As addressed above, a gesture is defined by its gesture definition. The gesture definition conforms to an object model for creating and defining gestures. Key elements of the object model include a gesture identifier, a visual media item, a referred location on image, a referred string, a type of referential gesture (such as a route, a shape, a pointer, etc.) and an author. Each of these elements can be thought of as a field in a database, or vector. An example object model and gesture definitions are shown in table 1, below.

The gesture identifier (see table 1) can be an identifier for the gesture. In some embodiments, such as when there are multiple gestures in a content item, each gesture can be defined in the same data object, such as a table, and each gesture can be identified by its gesture identifier.

The visual media identifies the visual media to which the gesture refers. The visual media can refer to a collection of visual media, and identify a single item of visual media within the collection, or can refer to an item of visual media in its own collection. In table 1, below, the visual media is identified by a directory, and file name. In some embodiments, the visual media is identified by a source of a file defining the visual media. For example, the visual media can be identified by a directory location (on local content storage 154, content storage 142, or at a webserver via the Internet, etc.).

The type identifies the type of referential gesture such as a point, route, or a shape/area.

The end point object identifies the icon or graphic to be used as the object. In table 1, the end point objects are identified by their Unicode Emoji identifiers.

The string identifies the string to which the gesture pertains. In some embodiments, it is sufficient to merely identify the string, but often the string will need to be identified by a location in a content item. In some embodiments, the location of the string is identified by inserting the code to create the referential gestures immediately after the string in a markup language or scripting language that is not visible other than by converting the string to an actuatable link. In some embodiments, the string might also refer to another gesture, which can have the effect of linking the gestures together so that they can be displayed simultaneously, or otherwise in a coordinated fashion.

The location in media identifies the location on the visual media to which the gesture points. When the referential gesture is a pointer, the location in media is an x,y coordinate. When the referential gesture is a route, the location in media is a series of x,y points to be displayed in sequence. The endpoint objects used to illustrate the pointer gesture and the route can be identified in the gesture definition for the respective gesture. For a shape or area, the location in media is a collection of x,y coordinates that create the boundaries of an area—accordingly, for gesture id 3 in table 1, the area is a triangle defined by the three points identified in the table.

The author field can identify the creator of the gesture. In some embodiments, a user identifier is included in the author field. The user identifier can be used by the content item editor application to display an avatar associated with the creator of the gesture when displaying the gesture. The user identifier can be an identifier associated with a user account, e.g. user account of content management system 110.

While Table 1 includes example gesture definitions, it should be appreciated that a gesture definition can be expanded to include additional features, such as linking of gestures, sequencing display of gestures, formatting options such as lines and line weights, references to CSS or scripts for enhances styles or animations, etc.

Figure 4A:
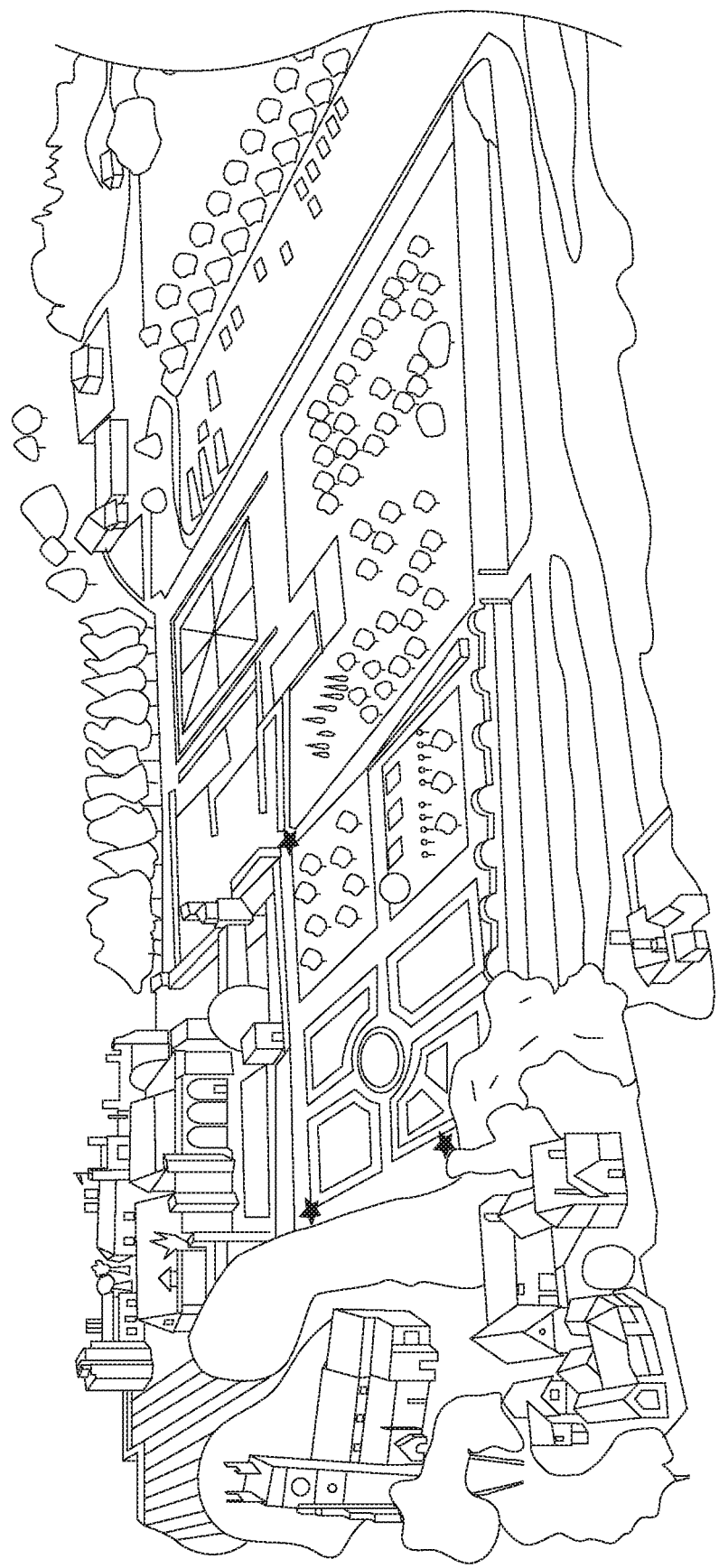
FIG. 4A, FIG. 4B, FIG. 4C, and FIG. 4D illustrate an example referential gesture referring to a route in accordance with some embodiments of the present technology.

FIG. 4A, FIG. 4B, FIG. 4C, and FIG. 4D illustrate an example gesture referring to a route. FIG. 4A shows text string 402 in a stylized font indicating that the string is associated with a gesture. In some embodiments, string 402 is stylized in the same manner as any string associated with a hyperlink. In some embodiments, string 402 is stylized differently than a hyperlink in a manner that is unique to gestures to visually indicate that the string is associated with a gesture.

Figure 4B:
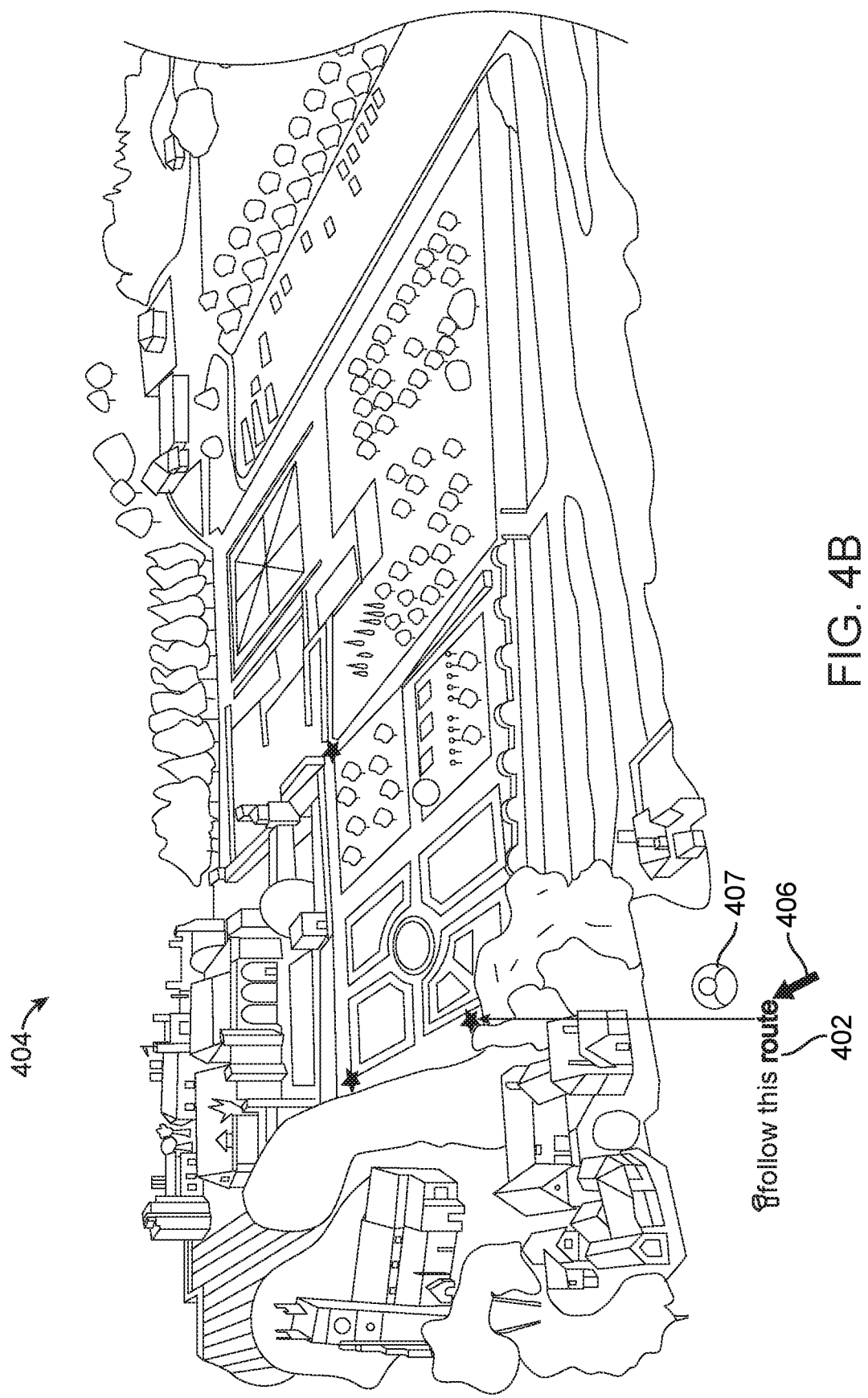
Figure 4C:
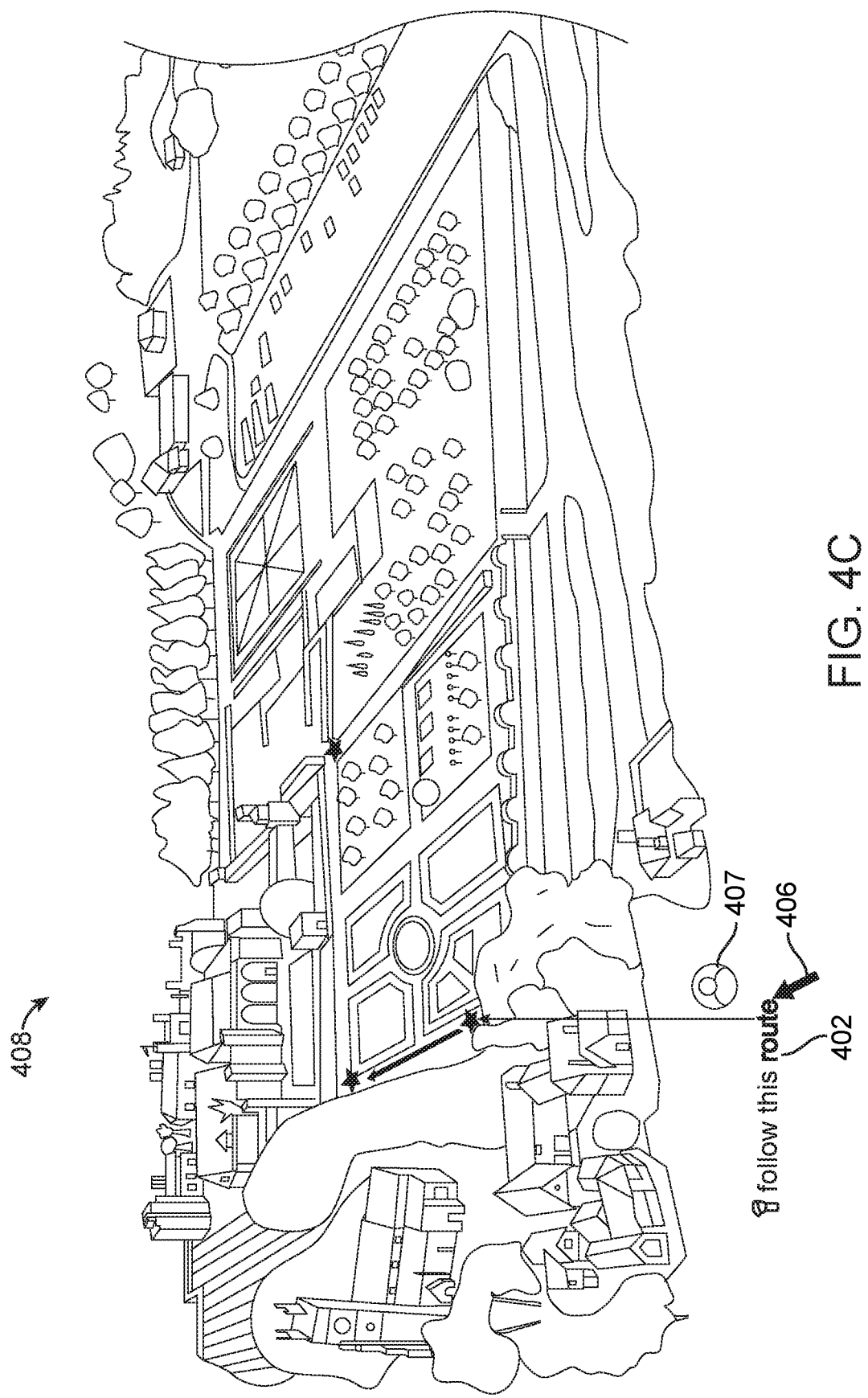
Figure 4D:
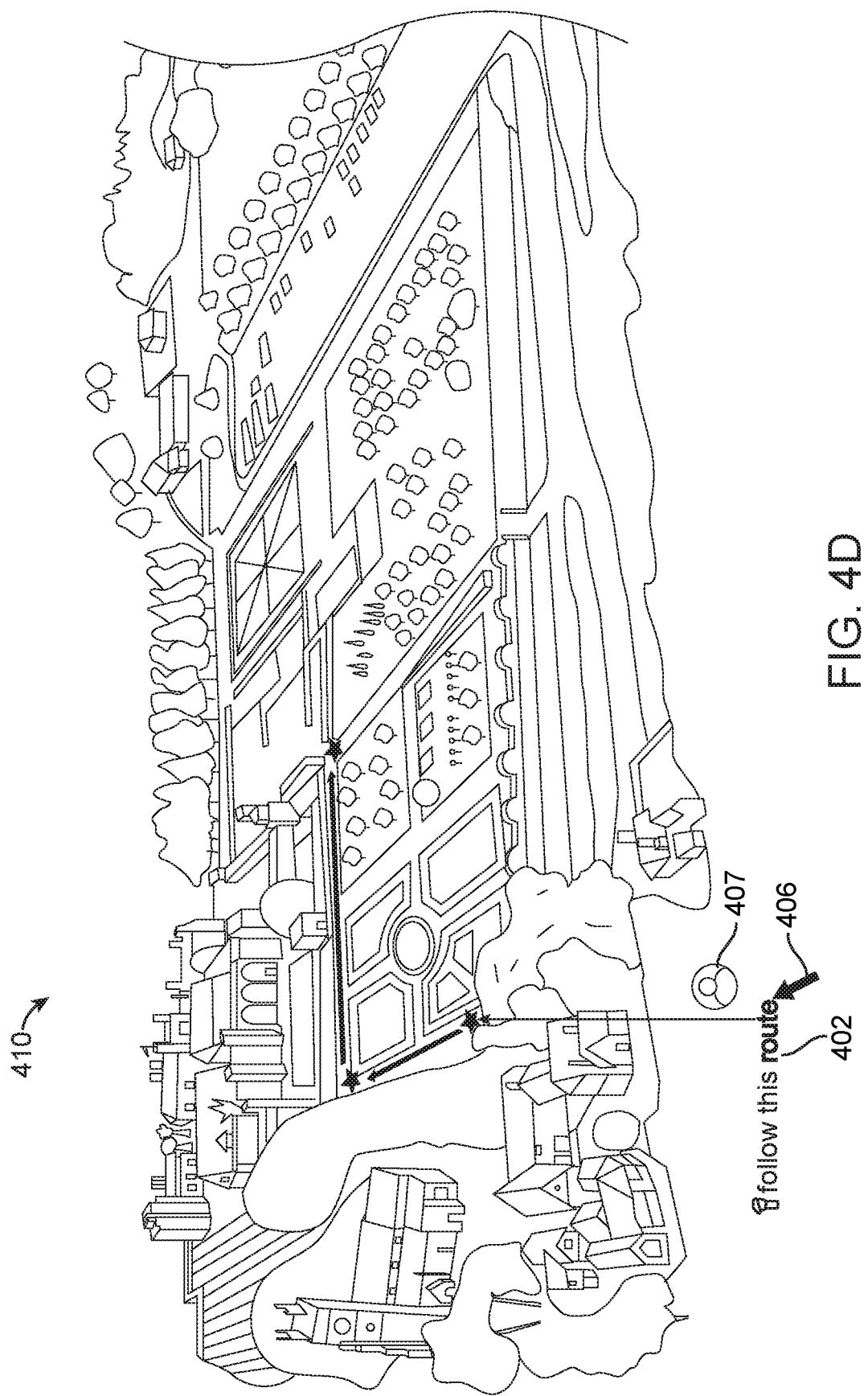

FIG. 4B, FIG. 4C, and FIG. 4D are further discussed with reference to FIG. 5. The method illustrated in FIG. 5 should not be limited by the embodiments illustrated in FIG. 4B, FIG. 4C, and FIG. 4D, and vice versa.

As shown in FIG. 4B a user has moved pointer 406 over text string 402, which is received (230) by content item editor application as an actuation (230) of the link, and in turn causes content item editor application to reveal a visualization (232) of the gesture. As seen in FIG. 4B the visualization is a first frame 404 of the gesture—which displays an animated route. Without any further action of the part of the user, the animation proceeds to show the frame 408 illustrated in FIG. 4C and frame 410 illustrated in FIG. 4D. FIG. 4C displays the second frame 408 of the route, and FIG. 4D displays the third frame 410 of the route. While the route illustrated in FIG. 4A, FIG. 4B, FIG. 4C, and FIG. 4D is shown in three frames, a route can be shown in any number of frames.

Additionally, each of FIGS. 4B, 4C, and 4D illustrate an avatar 407 for the author of the referential gesture.

Figure 5:
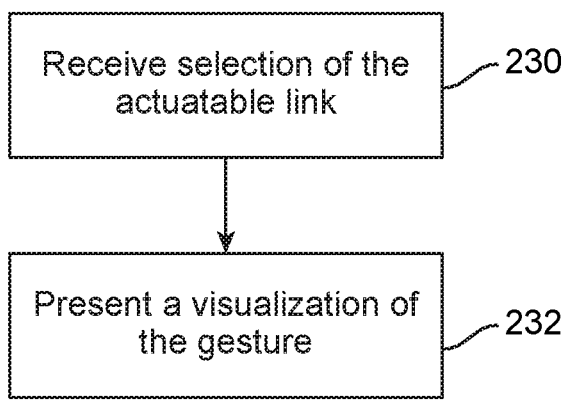
FIG. 5 shows an example method of displaying a referential gesture in accordance with some embodiments of the present technology.

While the method illustrated in FIG. 2 was discussed with reference to FIGS. 3A, 3B, 3C, and 3D, and while the method illustrated in FIG. 5 was discussed with reference to FIGS. 4A, 4B, 4C, and 4D illustrating a route type referential gesture, it should be appreciated that the methods illustrated in FIG. 2 and FIG. 5 are both equally applicable to all referential gesture types.

Figure 6:
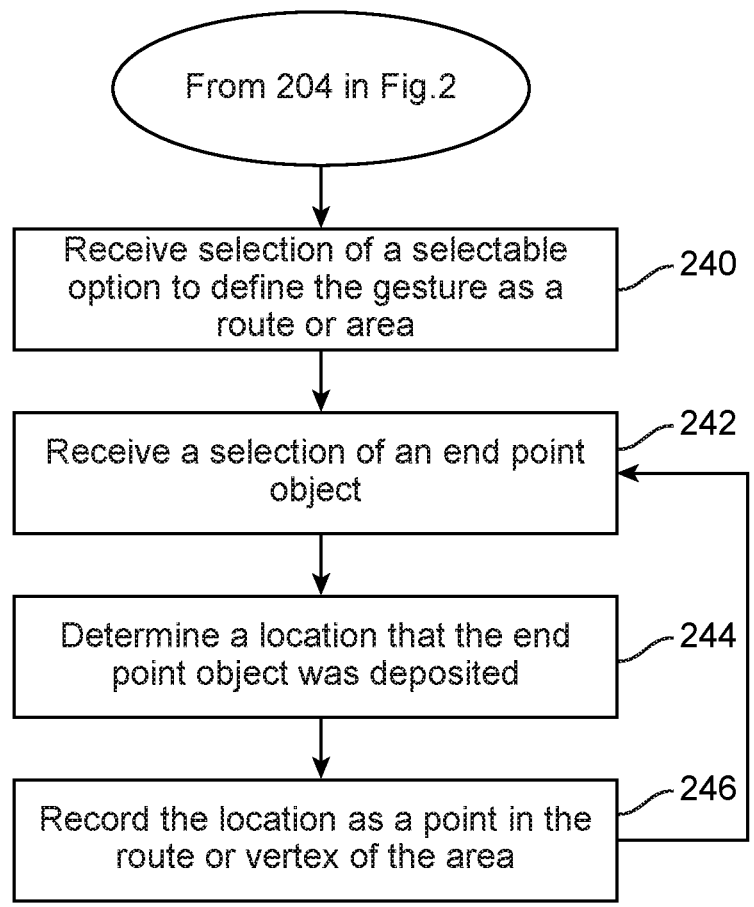
FIG. 6 shows an example method of creating a referential gesture pointing to a route or area in accordance with some embodiments of the present technology.

FIG. 6 illustrates an example method for creating a referential gesture pointing to a route or an area. In some embodiments, the gesture creation menu (presented (204) in FIG. 2) can provide an option to create a gesture pointing to a route or area or end point object, etc. The content item editor can receive a selection (240) of one of those options, and specifically with reference to FIG. 6, can receive a selection (240) of an option to define the referential gesture to point to a route or an area.

A route or an area is different than a pointer to an end point object in the most basic aspect that a route or area is defined by multiple points. As such, the content item editor

TABLE 1

Referential Gesture Definitions

| Gesture ID | Type | Visual Media | End point Obj. | String | Location in Media | Author |
|---|---|---|---|---|---|---|
| 1 | pointer | Dir1, Image1 | U + 1F600 | "love" | 95, 3 | User1 |
| 2 | route | Dir2, Image1 | U + 2B50 | "route" | (10, 20)(5, 20) (100, 100) | User1 |
| 3 | shape | Dir1, Image2 | | "here" | (10, 20)(5, 20) (100, 100) | User1 |
| 4 | direction | Dir3, Image 1 | U + 2191 | "this way" | 95, 3 | User1 |
| 5 | angle | Dir3, Image 1 | U + 2220 | "degrees" | (10, 20)(5, 20) | User1 | can receive a selection of multiple end points and detect their locations in the visual media items. This action will need to be performed repetitively until the route or area is defined. For example the content item editor can receive a selection (242) of a first end point object and determine (244) a location on the visual media item that the end point object was deposited and can record (246) the location as a point in the route or a vertex of the area. The process (242, 244, 246) can be repeated for a second end point object, and a third, and so forth until the route or area has been defined. Each end point object will be considered to have been placed in series in order when the gesture points to a route. When the gesture points to an area, each end point object will be considered to be placed in series in a loop such that the first end point object is linked to the second, and the second end point object linked to the third, etc. The last end point object defining the area will be linked back to the first end point object defining the area.

While routes are referenced throughout the description, it should be appreciated by those of skill in the art, that the gesture can be any animation and does not necessarily have to define a route. For example, the animation could identify a sequence or motion, etc.

Further, while this description only discusses referential gestures in the form of pointers, routes, and areas, it will be appreciated that the referential gesture can take other forms without departing from the scope and spirit of the present disclosure.

Figure 7:
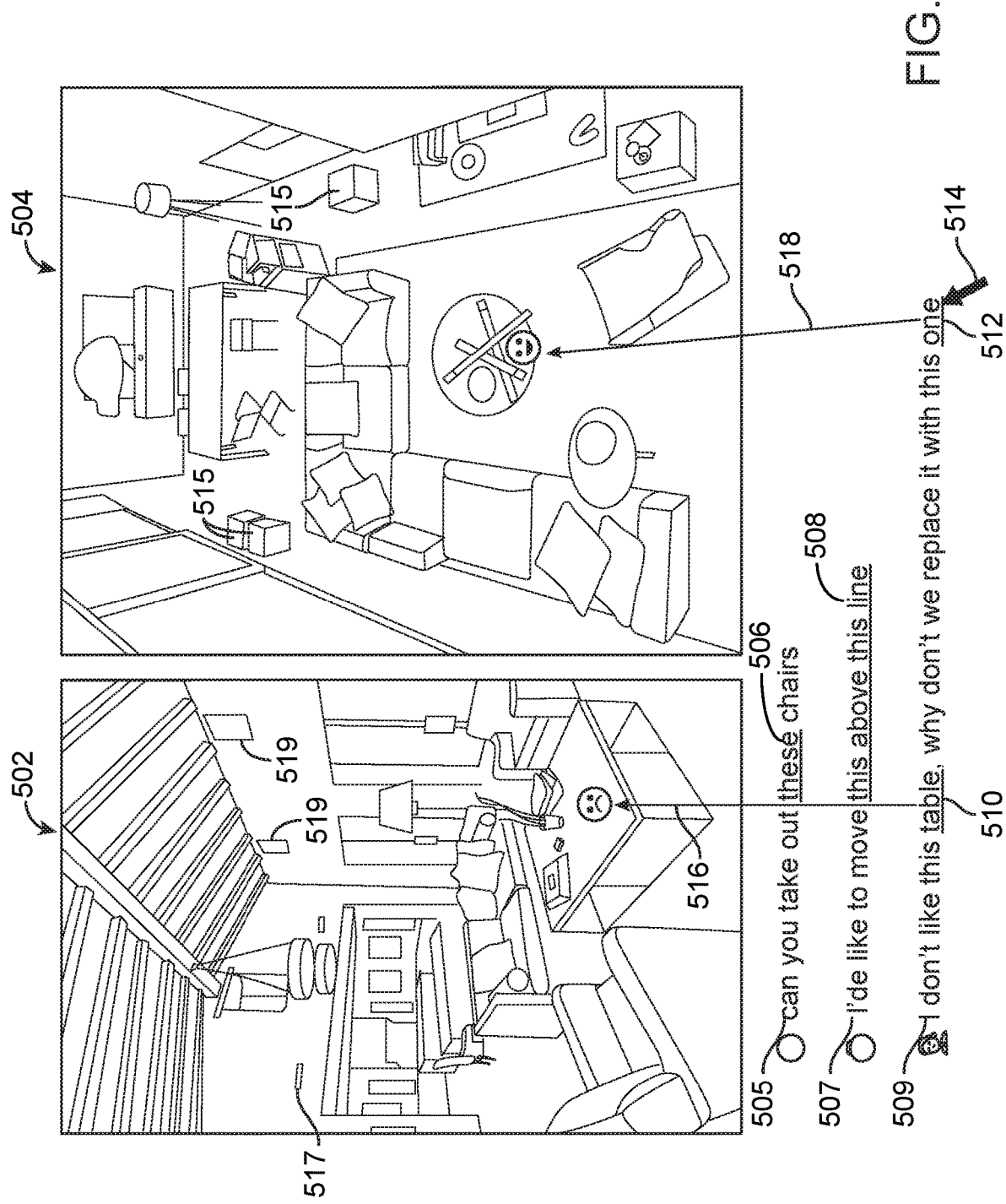
FIG. 7 shows an example graphical user interface showing multiple referential gestures displayed simultaneously in accordance with some embodiments of the present technology.

FIG. 7 illustrates another example referential gesture. FIG. 7 illustrates a gallery containing visual media items 502 and 504. Both visual media items 502 and 504 are displayed in the same content item at the same time. FIG. 7 also includes sentences 505, 507, and 509, and each of these sentences includes at least one string for which a gesture is associated. Sentence 505 includes actuatable string 506, sentence 507 includes actuatable string 508, and sentence 509 includes actuatable strings 510 and 512. Actuatable string 506 links to pointer type gestures where actuating string 506 reveals multiple pointers referencing chairs 515. Actuatable string 506 links to pointer type gestures where one pointer points to object 517 on a wall and another pointer simultaneously points to a higher location on the wall that is above an invisible line created between the bottom of the two windows 519. Sentence 509 compares visual media item 502 and 504.

As shown in FIG. 7 referential gesture 516 and referential gesture 518 are both displayed at the same time. In some embodiments, the default behavior for a referential gesture is for it to be displayed when a pointer (such as pointer 514) hovers over a string or clicks on the string, and the gesture is hidden when the pointer moves away from the string. However, in some embodiments it is possible to display multiple gestures at the same time by selecting multiple strings by depressing the control or shift key while selecting the gestures to be displayed simultaneously.

In some embodiments, it can be possible to link two gestures to each other so that they are always displayed together. This can be accomplished by referencing the other referential pointer ID in the gesture definition.

In some embodiments, the same string can be associated with multiple pointers at the same time.

Figure 8:
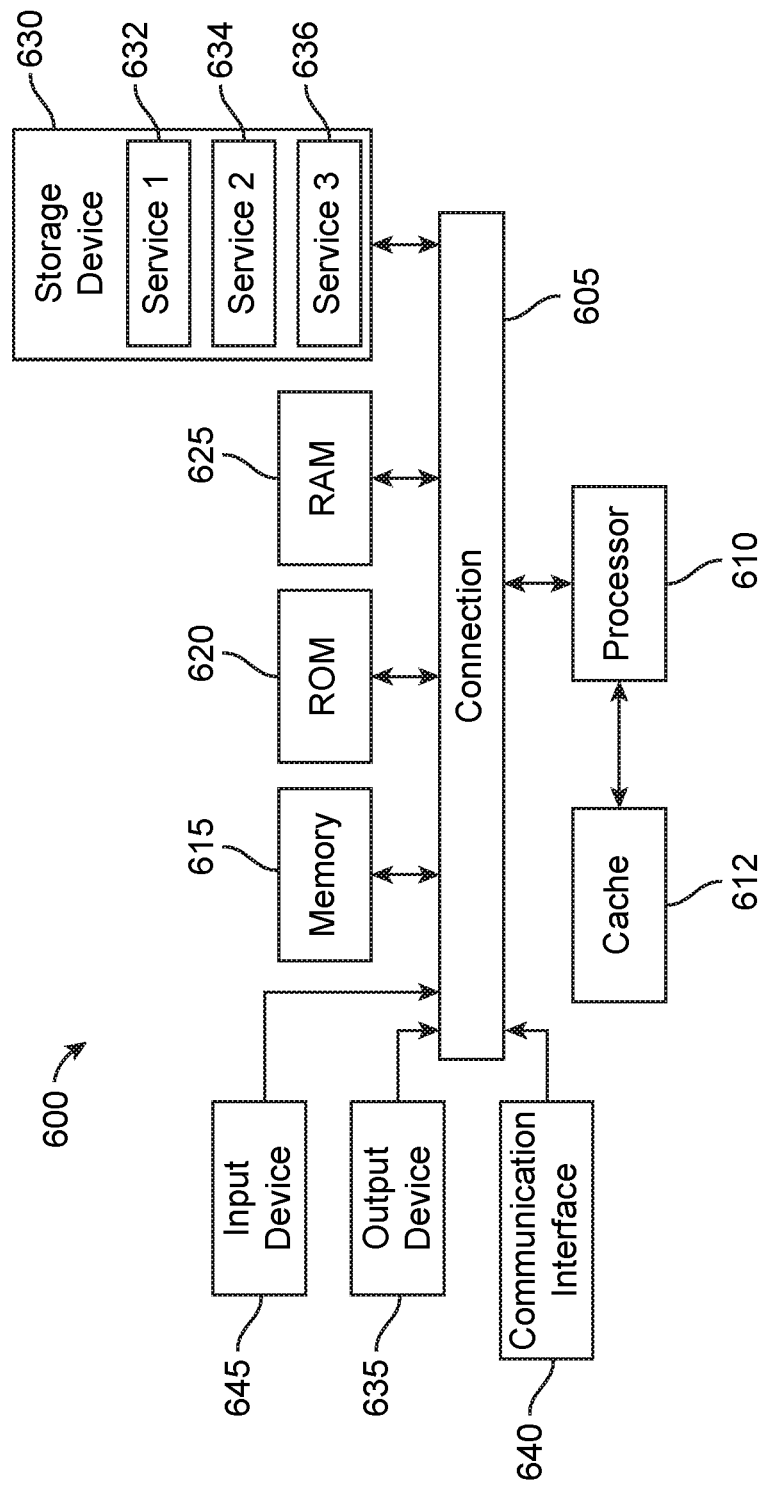
FIG. 8 shows an example of a system for implementing certain aspects of the present technology.

FIG. 8 shows an example of computing system 600, which can be for example any computing device making up client device 150, content management system 110 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions, the instructions, when executed by a computing system, cause the computing system to:
   receive a selection of a text string in a content item, wherein the content item comprises the text string and a visual media item separate from the text, string;
   following the selection of the text string, present an end point object and create a referential gesture associating the end point object to a selected location in the visual media item, wherein the referential gesture graphically illustrates the text string is referencing the selected location in the visual media item displayed in the content item; and
   convert the text string into an actuatable link that when actuated results in presentation of the referential gesture.

2. The non-transitory computer readable medium of claim 1, the instructions to cause the computing system to:
   following the selection of the text string, present a gesture creation menu to assist with creation of the referential gesture;
   receive a selection of the end point object of the referential gesture, the end point object selected from the gesture creation menu; and
   after the selection of the end point object, deposit the end point object at the selected location in the visual media item.

3. The non-transitory computer readable medium of claim 2, wherein the gesture creation menu provides a selectable option to define a referential gesture type.

4. The non-transitory computer readable medium of claim 3, the instructions to cause the computing system to:
   receive a selection of the selectable option to define the referential gesture type as a route;
   deposit the end point object at locations in the visual media item corresponding to locations along the route;
   receive a selection of the actuatable link; and
   after the selection of the actuatable link, present a visualization of the route that graphically illustrates that the text string is referencing the end point object at a first corresponding location in the visual media item, and then present the end point object at a second corresponding location in the visual media item.

5. The non-transitory computer readable medium of claim 1, instructions to cause the computing system to:
   create a gesture definition for the referential gesture, the gesture definition including at least a reference to the text string, an identification of the visual media item, and a reference to the selected location in the visual media item.

6. The non-transitory computer readable medium of claim 5, the instructions to cause the computing system to:
   store an author identifier for a creator of the referential store within the gesture definition; and
   present a visualization of the referential gesture with an avatar identifying awhor of the referential gesture.

7. The non-transitory computer readable medium of claim 5, wherein the gesture definition further includes an identification of the end point object.

8. The non-transitory computer readable medium of claim 1, the instructions to cause the computing system to:
receive a selection of the actuatable link; and
after the selection of the actuatable link, present a visualization of the referential gesture that graphically illustrates that the text string is referencing the selected location in the visual media item.

9. The non-transitory computer readable medium of claim 8, wherein the selection of the actuatable link is a pointer hover over the actuatable link.

10. A method comprising:
receiving a selection of a text string in a content item wherein the content item comprises the text string and a visual media item separate from the text string;
following the selection of the text string, presenting an end point object and creating a referential gesture associating the end point, object to a selected location in the visual media item, wherein the referential gesture graphically illustrates the text string is referencing the selected location in the visual media item displayed in the content item; and
converting the text string into an actuatable link that when actuated results in presentation of the referential gesture.

11. The method of claim 10, comprising:
following the selection of the text string, presenting a gesture creation menu to assist with creation of the referential gesture;
receiving a selection of the end point object of the rereferential gesture, the end point object selected from the gesture creation menu; and
after the selection of the end point object, associating the end point object with the selected location in the visual media item.

12. The method of claim 11, wherein the gesture creation menu provides a selectable option to define a referential gesture type, the method comprising:
receiving a selection of the selectable option to define the referential gesture type as a route;
depositing the end point object at locations in the visual media item corresponding to locations along the route;
receiving a selection of the actuatable link; and
after the selection of the actuatable link, presenting a visualization of the route type of referential gesture that graphically illustrates that the text string is referencing the end point object at a first corresponding location in the visual media item, and then present the end point object at a second corresponding location in the visual media item.

13. The method of claim 10, comprising:
creating a gesture definition for the referential gesture, the gesture definition including at least a reference to the text string, an identification of the visual media item, and a reference to the selected location in the visual media item.

14. The method of claim 13, comprising:
storing an author identifier for a creator of the referential gesture within the gesture definition; and
presenting a visualization of the referential gesture with an avatar identifying the author of the referential gesture.

15. The method of claim 10, comprising:
receive a selection of the actuatable link; and
after the selection of the actuatable link, present a visualization of the referential gesture that graphically illustrates that the text string is referencing the selected location in the visual media item.

16. A system comprising:
one or more processors;
a computer readable medium storing instructions thereon, when executed the instructions effective to cause the one or more processors to:
receive a selection of a text string in a content item, wherein the content item comprises the text string and a visual media item separate from the text string:
following the selection of the text string, present an end point object and create a referential gesture associating the end point object to a selected location in the visual media item, wherein the referential gesture graphically illustrates the text string is referencing the selected location in the visual media item displayed in the content item; and
convert the text string into an actuatable link that when actuated results in presentation of the referential gesture.

17. The system of claim 16 wherein the instructions to cause the one or more processors to:
following the selection of the text string, present a gesture creation menu to assist with creation of the referential gesture;
receive a selection of the end point object of the referential gesture, the end point object selected from the gesture creation menu; and
after the selection of the end point object, associate the end point object with the selected location in the visual media item.

18. The system of claim 17 wherein the gesture creation menu provides a selectable option to define a referential gesture type.

19. The system of claim 18 wherein the referential gesture type is a pointer to an area and wherein the selected location in the visual media item is a shape defining an area within the visual media item.

20. The system of claim 16 wherein the instructions to cause the one or more processors to:
create a gesture definition for the referential gesture, the gesture definition including at least a reference to the text string, an identification of the visual media item, and a reference to the selected location in the visual media item.

21. The system of claim 16 wherein the instructions to cause the one or more processors to:
receive a selection of the actuatable link; and
after the selection of the actuatable link, present a visualization of the referential gesture that graphically illustrates that the text string is referencing the selected location in the visual media item.

* * * * *